United States Patent
Castro et al.

(10) Patent No.: US 9,415,478 B2
(45) Date of Patent: Aug. 16, 2016

(54) METHOD FOR MANUFACTURING OPHTHALMIC LENSES BY MACHINING

(71) Applicant: ESSILOR INTERNATIONAL (COMPAGNIE GENERALE D'OPTIQUE), Charenton-le-Pont (FR)

(72) Inventors: Luis Castro, Charenton-le-Pont (FR); Eric Gacoin, Charenton-le-Pont (FR); Jerome Moine, Charenton-le-Pont (FR); Bernard Pons, Charenton-le-Pont (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

(21) Appl. No.: 14/439,057

(22) PCT Filed: Oct. 29, 2013

(86) PCT No.: PCT/FR2013/052591
§ 371 (c)(1),
(2) Date: Apr. 28, 2015

(87) PCT Pub. No.: WO2014/068248
PCT Pub. Date: May 8, 2014

(65) Prior Publication Data
US 2015/0273646 A1    Oct. 1, 2015

(30) Foreign Application Priority Data

Oct. 30, 2012    (FR) .................................... 12 60371

(51) Int. Cl.
*B24B 13/00* (2006.01)
*B24B 13/005* (2006.01)
*B29D 11/00* (2006.01)

(52) U.S. Cl.
CPC ...... *B24B 13/0055* (2013.01); *B29D 11/00942* (2013.01); *Y10T 29/49995* (2015.01)

(58) Field of Classification Search
CPC .................... B24B 13/0055; B29D 11/00942; Y10T 29/49995
See application file for complete search history.

(56) References Cited

U.S. PATENT DOCUMENTS

2004/0066487 A1    4/2004    Chansavoir et al.
2008/0129959 A1    6/2008    Mandler et al.

FOREIGN PATENT DOCUMENTS

| EP | 2 199 021 A1 | 6/2010 |
| FR | 2 819 897 A1 | 7/2002 |
| GB | 2084493 A | 4/1982 |
| WO | 2004/080653 A1 | 9/2004 |

OTHER PUBLICATIONS

International Search Report, dated Jun. 30, 2014, from corresponding PCT application.

*Primary Examiner* — Moshe Wilensky
(74) *Attorney, Agent, or Firm* — Young & Thompson

(57) ABSTRACT

A method for manufacturing an ophthalmic lens by machining, includes the steps of providing and mounting a blank on a first supporting device having a first machining reference frame in a first position in which a lower surface of the blank is opposite the first device; machining, in the first position in the first reference frame, an upper surface of the blank, machining in a second predetermined machining reference frame which is known relative to the first at least one mechanical referencing element on the blank, and providing a second supporting device including at least one complementary mechanical referencing element configured such as to engage with the at least one mechanical referencing element so that the latter is positioned and supported on the second device in a second predetermined position.

14 Claims, 4 Drawing Sheets

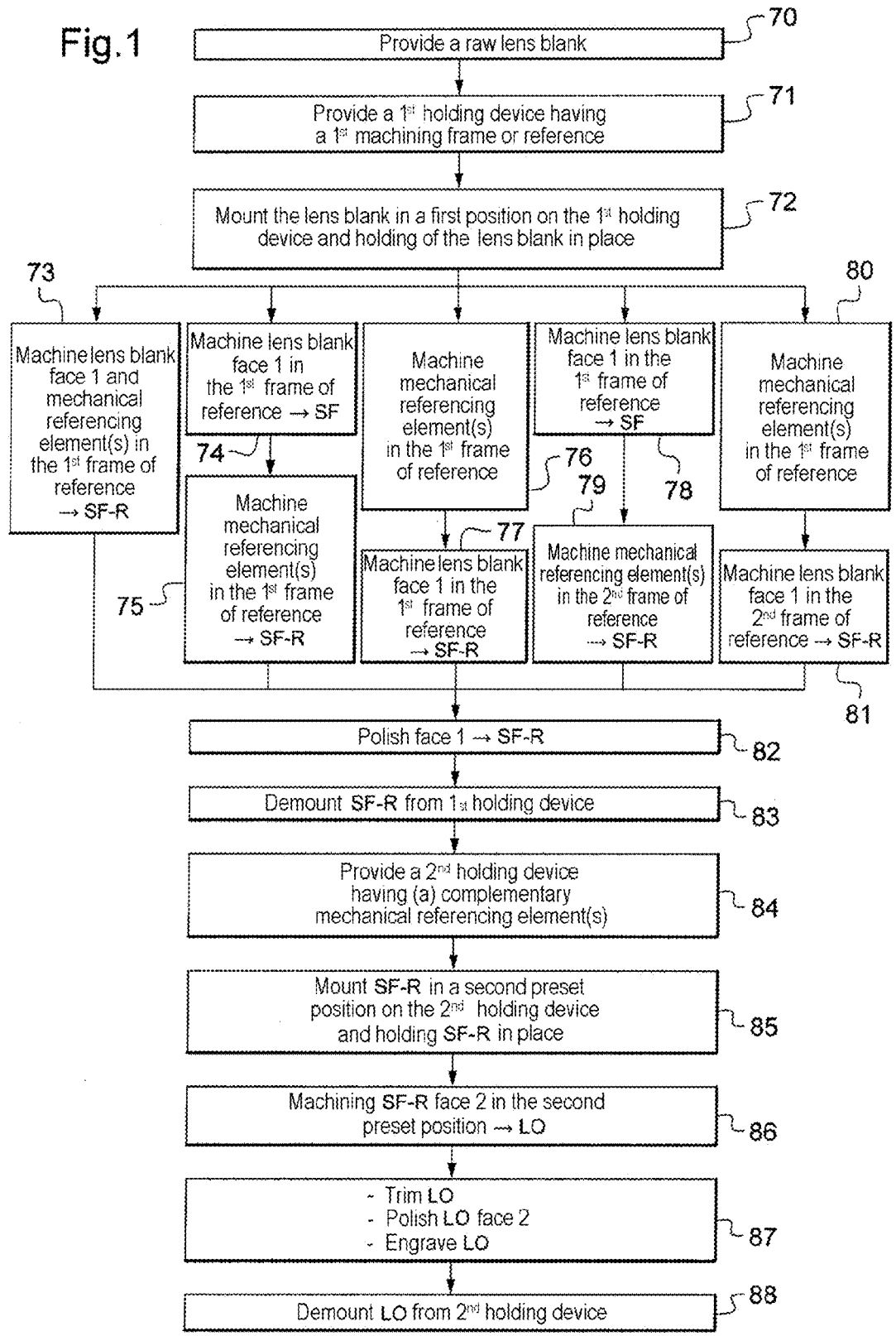

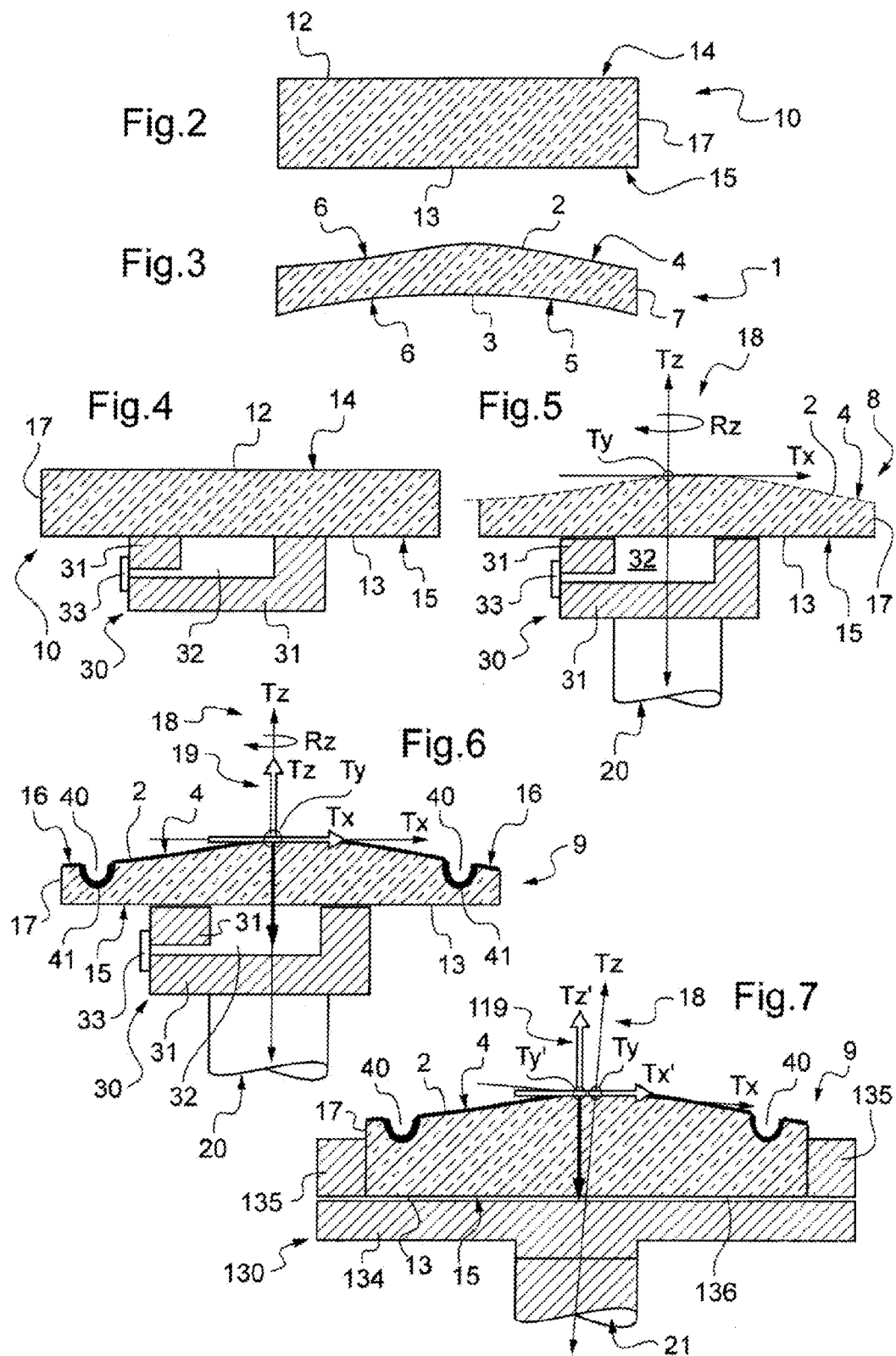

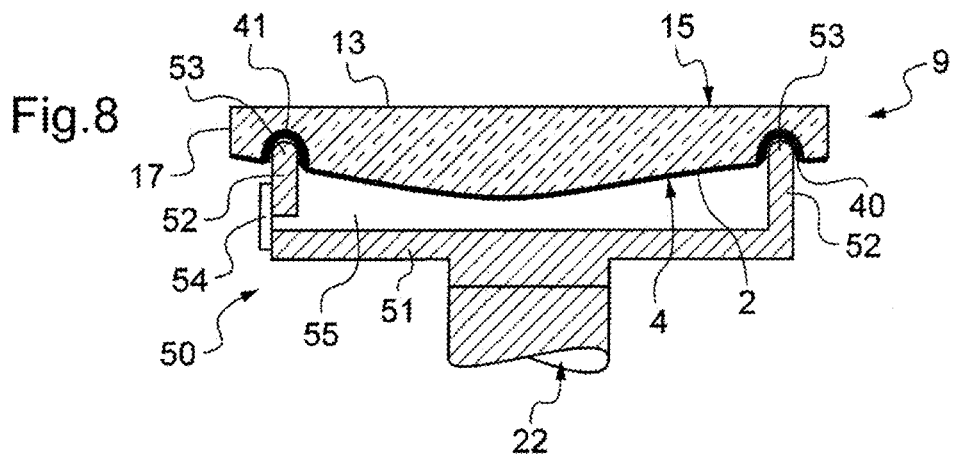
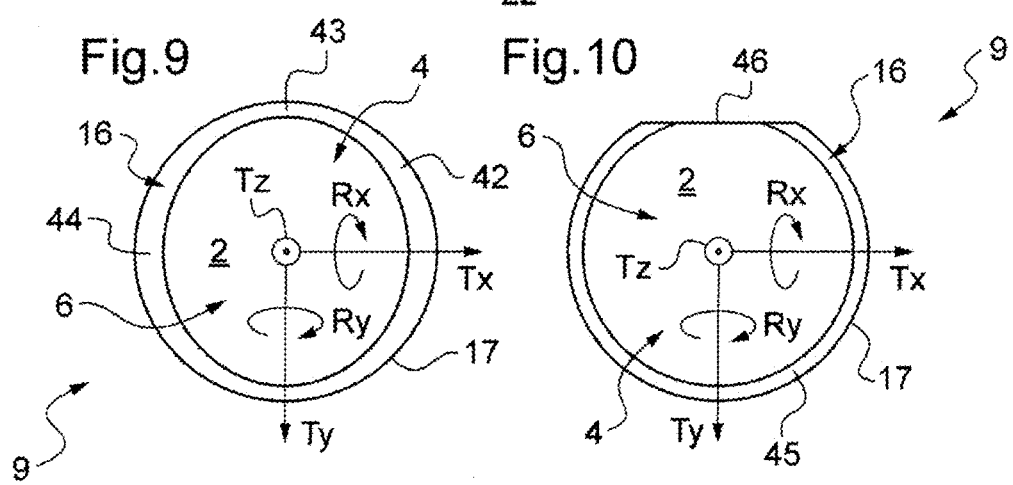
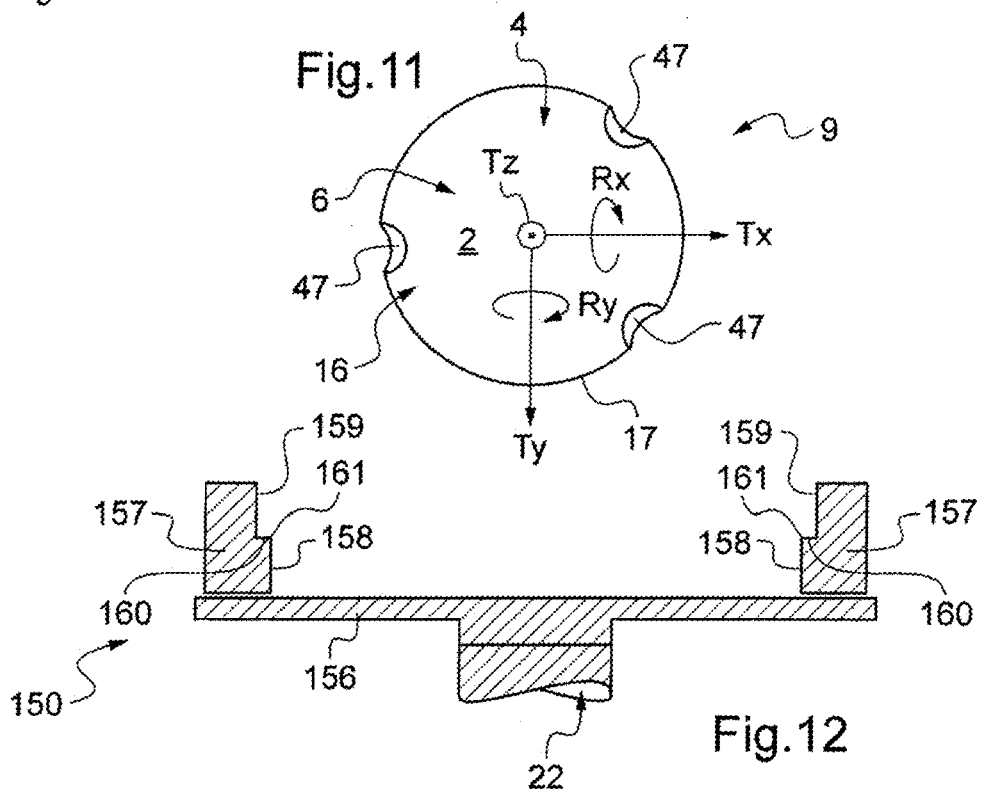

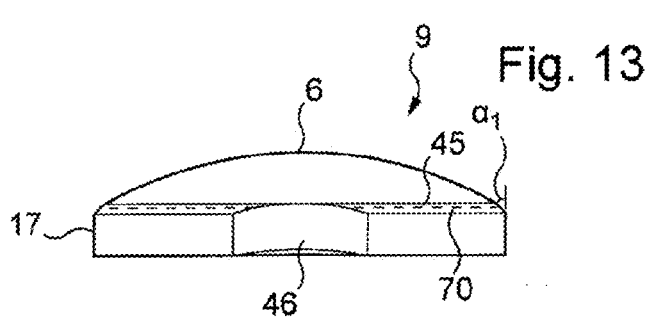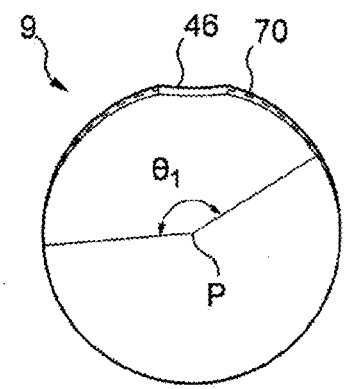
Fig. 13
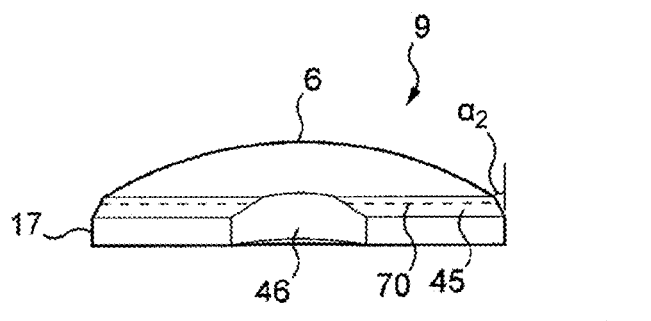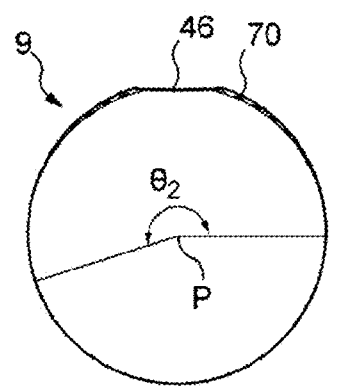
Fig. 14
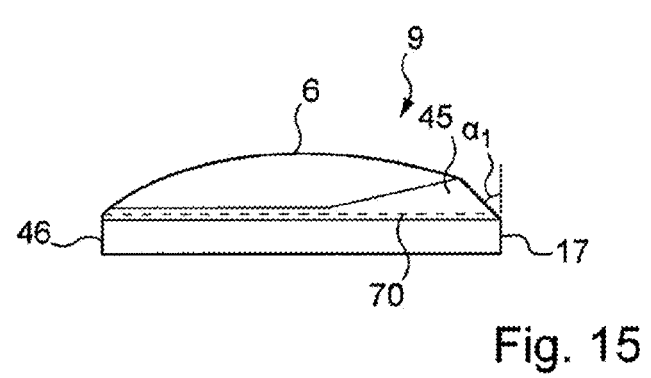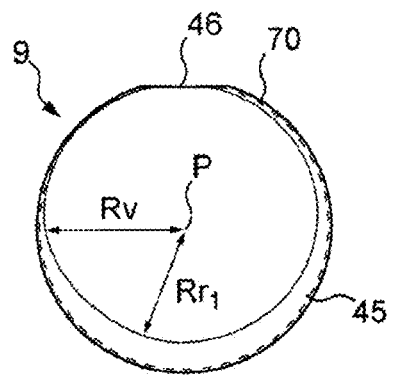
Fig. 15
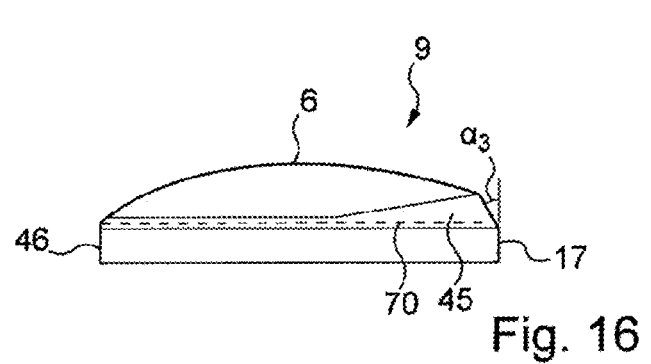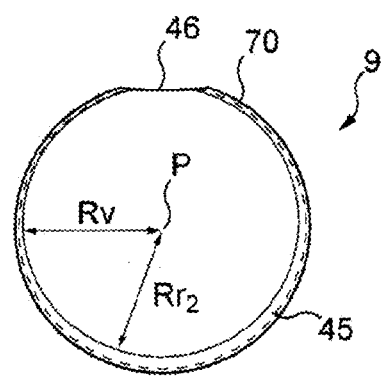
Fig. 16

METHOD FOR MANUFACTURING OPHTHALMIC LENSES BY MACHINING

The invention relates to the field of ophthalmic lens manufacturing.

The invention more particularly relates to processes for manufacturing such ophthalmic lenses having a first face and a second face opposite the first face.

Such manufacturing processes comprising a step of providing a lens blank, also called a semi-finished lens blank, having a preformed upper face and a lower face to be machined are already known from European patent application EP 2 199 021.

Here, the first face of the lens is formed by the upper face of the lens blank, and the second face of the lens is formed by the lower face of the lens blank.

The manufacture of such a lens typically comprises steps in which the surface of the lens blank is marked.

For example, this may involve points or crosses identifying a particular point (for example the optical center of the lens or the prism reference point for a progressive lens), axis lines (for example indicating the horizontal axis along which astigmatism is corrected) and shapes bounding a particular zone (for example a near vision zone or a far vision zone in the case of progressive ophthalmic lenses). Likewise, it may be necessary to produce marks allowing the lens to be identified, or other commercial marks.

These marks are generally produced by micro-engraving or are printed marks, called temporary marks.

The lens blank thus marked is then mounted on what is referred to as a supporting ring.

This ring is annular and comprises on an upper edge a plurality of visual control guides.

The operator may thus roughly position the lens blank on the ring visually by comparing the positions of the marks on the lens blank and the visual guides on the ring. If needs be, the operator may modify the position of the lens blank on the ring by manually moving it translationally in three directions relative to three axes of a basic orthonormal coordinate system, and in rotation also in three directions defined about each of the three axes, respectively.

The lens blank is then fastened to this ring and to a blocking pin by way of a binding material, here what is referred to as a fusible metal, extending from the upper face of the lens blank as far as this blocking pin.

The ring is thus interposed between the lens blank and the blocking pin.

The blocking pin, together with the ring and the lens blank, is mounted on a blocking and controlling apparatus, which apparatus comprises an imaging device, also called a video camera, configured to image both the control guides of the ring and the marks on the lens blank.

The apparatus thus determines a first position of the lens blank relative to the ring, and more precisely of the marked upper face of the lens blank, and then determines a positioning error by comparing this first position to a preset position of the lens blank relative to the ring.

The first position of the lens blank corresponds to the actual position of the upper face of the lens blank relative to the ring and the positioning error is representative of corrections that must be made to a surface file of the lower face. This surface file is a file used in the machining of the lower face of the lens blank, which file is loaded into a machine tool to machine this lower face.

The blocking and controlling apparatus therefore transmits this positioning error and/or these coordinate corrections to a machine tool configured to machine the lower face of the lens blank on the basis of the corrected surface file, in order to form the second face of the ophthalmic lens.

The invention aims to provide a process for manufacturing ophthalmic lenses that is simple, easy to implement and economical.

Thus, the subject of the invention is a process for manufacturing by machining an ophthalmic lens having a first face and a second face opposite said first face, said first face being provided with a first optical area, and said second face being provided with a second optical area, said first and second optical areas defining an optically useful zone of said ophthalmic lens, said process comprising steps of:

providing a lens blank having an upper face, and a lower face opposite said upper face and a peripheral edge face joining said upper and lower faces;

providing a first holding device having a first machining frame of reference defined by three translational directions corresponding to three axes of a basic orthonormal coordinate system and by three rotational directions defined about said three translational directions, respectively, with two of said three translational directions being located in one and the same first plane and the other of said three translational directions being located in a second plane; said process being characterized in that it comprises steps of:

mounting said lens blank on said first holding device in a first position in which said lower face of said lens blank is facing said first holding device, which is configured to hold said lens blank via its lower face or via its peripheral edge face;

machining, in said first position in said first machining frame of reference, said upper face to obtain said first optical area and thus form a semi-finished lens blank;

machining, in a second machining frame of reference defined in the same way as said first machining frame of reference, at least one mechanical referencing element in at least any one of said upper and lower faces and said peripheral edge face, said second machining frame of reference being preset and known relative to said first machining frame of reference, and said machining step being configured so that said at least one mechanical referencing element is located outside of said optically useful zone, so as thus to form a referenced semi-finished lens blank; and providing a second holding device comprising at least one complementary mechanical referencing element, which is configured to interact with said at least one mechanical referencing element of said referenced semi-finished lens blank so that the latter is positioned and held on said second holding device in a second position that is preset at least in said three translational directions and in said two rotational directions defined about said two translational directions that are located in said first plane, respectively;

said at least one mechanical referencing element being formed by machining at least one chamfered zone produced at least in said peripheral edge face and in either one of said upper and lower faces, outside of said optically useful zone, and said at least one complementary mechanical referencing element being formed by at least one shoulder produced in said second holding device and configured to receive in abutment said at least one chamfered zone.

The manufacturing process according to the invention has the advantage of making it simple, easy and economical to precisely position the second face of the lens relative to the first face of the lens with a view to machining this second face, while limiting, or even eliminating, possible positioning errors.

In fact, it is a question of positioning the lower face of the lens blank relative to the first face of the lens for the machining the second face of the lens.

Machining the upper face to form the first optical area in the first position in the first machining frame of reference allows a reference to be created.

Machining said at least one mechanical referencing element in the second machining frame of reference (which is known relative to the first) allows this or these elements to be exactly positioned on the semi-finished lens blank (outside of the optically useful zone). It may be a question of the raw lens blank if the machining of the one or more elements is carried out before the upper face is machined to form the first optical area.

The optically useful zone is the zone of the ophthalmic lens that has the optical features associated with the prescription of the wearer. It is generally a question of a zone of the lens that is located in a spectacle frame when this lens has been cut to the shape of the frame and fitted in the latter.

The first position in which the lens blank is mounted and held on the first holding device is a position in which it is possible to machine the upper face of the lens blank to form a semi-finished lens blank, and to machine said at least one mechanical referencing element. In other words, the first position is any position, insofar as it is not set or preset, in which the aforementioned machining steps may be carried out.

These two machining steps therefore allow a referenced semi-finished lens blank to be obtained on which one or more mechanical referencing elements and a first optical area are positioned in a set way relative to each other (or to one another).

These two machining steps are generally carried out using one and the same first holding device in which the lens blank does not change position (in other words, the lens blank is not demounted from the first holding device between the two machining steps), but depending on the one or more mechanical referencing elements produced by machining, the lens blank may be demounted from the first holding device between these two machining steps. It is possible to remount the lens blank with precision because the second machining frame of reference is preset and known relative to the first machining frame of reference. In either case, the referenced semi-finished lens blank is demounted from the first holding device, in order to free it, before the lower face is machined to obtain the second optical area.

By virtue of the two machining steps described above and of provision of the second holding device, the referenced semi-finished lens blank is therefore ready to be positioned in a second preset position for the future machining of its lower face to form the second optical area of the lens.

In this second preset position, the position of the lower face of the lens blank relative to the first face of the lens (i.e. the upper face of the lens blank after it has been machined to form the first optical area in this first face) is known in the three translational directions corresponding to the three axes of a basic orthonormal coordinate system, namely the directions Tx and Ty, which here are located in one and the same first plane, and the direction Tz, which is located in the second plane, and in the at least two rotational directions defined about the above translational directions Tx and Ty, respectively, namely Rx and Ry.

It will be noted that the expression "chamfered zone" is understood to mean a zone containing at least one sloped portion, for example a beveled or conical portion, or even a portion taking the form of a recess or shoulder, and that here the terms "chamfer" and "molding" are used to refer to such a zone taking any one of these forms.

According to preferred, simple, convenient and economical features of the method according to the invention:

said first machining frame of reference and said second machining frame of reference are coincident; meaning that the steps of machining the upper face of the lens blank to obtain the first optical area and at least one mechanical referencing element are carried out in one and the same machine tool;

said steps of machining said upper face and said at least one mechanical referencing element are successive or merged; meaning that the steps of machining the upper face of the lens blank to obtain the first optical area and at least one mechanical referencing element are either carried out at the same time (in one and the same machine) or in succession in one order or the other (the upper face before or after the mechanical referencing element)(in one and the same machine tool or in two separate machine tools);

said steps of machining said first machining frame of reference and said second machining frame of reference are separate, with said second machining frame of reference having a known offset relative to said first machining frame of reference; meaning that the steps of machining the upper face of the lens blank to obtain the first optical area and at least one mechanical referencing element are carried out in two separate machine tools;

said at least one other mechanical referencing element is formed by machining at least one grooved zone produced in said peripheral edge face or in either one of said upper and lower faces, outside of said optically useful zone; and at least one other of said complementary mechanical referencing elements is formed by at least one protuberance produced in said second holding device and configured to be received in abutment in said at least one grooved zone;

said at least one chamfered or grooved zone is at least partially continuous and of constant size, of constant width or depth, respectively, and said at least one mechanical referencing element is furthermore formed by machining a blocking zone on said peripheral edge face, which blocking zone is configured to position said referenced semi-finished lens blank in said rotational direction defined about said translational direction that is located in said second plane; meaning that the blocking zone furthermore allows the referenced semi-finished lens blank to be positioned in the other rotational direction defined about the translational direction Tz, namely Rz;

said at least one chamfered or grooved zone is at least partially continuous and of variable size, of variable width or depth, respectively; meaning that it is possible to have therein a plurality of chamfered or grooved zones and/or that this or these zones may be at different altitudes;

at least one other of said mechanical referencing elements is formed by machining a plurality of individual indents produced in said peripheral edge face and/or in either one of said upper and lower faces, outside of said optically useful zone; and at least one other of said complementary mechanical referencing elements is formed by a plurality of protuberances produced in said second holding device and configured to receive in abutment said plurality of individual indents; and/or the process furthermore comprises steps of mounting said referenced semi-finished lens blank on said second holding device in said second preset position, said device being configured to hold said referenced semi-finished lens blank via its upper face or via its peripheral edge face; and machining said lower face of said referenced semi-finished lens blank to obtain said second optical area and thus form said ophthalmic lens.

According to other preferred, simple, easily implementable and economical features of the process according to the invention:

said at least one chamfered zone of said lens blank has an angle of inclination relative to said edge face of said lens blank, which angle of inclination is set so as to increase contact between said lens blank and said second holding device depending on at least one preset constraint;

said angle of inclination of said at least one chamfered zone is set depending on a characteristic representative of a perimeter of contact between said at least one chamfered zone of said lens blank and said shoulder of said second holding device in order to ensure the stability of said lens blank in said second holding device; and/or said angle of inclination of said at least one chamfered zone is set depending on a characteristic representative of an optically useful zone of said ophthalmic lens in order to ensure a preset aperture for said ophthalmic lens.

The aperture of the ophthalmic lens is representative of the size of the optically useful zone.

The subject matter of the invention will now be explained by way of a description of one embodiment thereof, given, by way of nonlimiting illustration, below with reference to the appended drawings, in which:

FIG. 1 is a block diagram illustrating various operating steps of the process for manufacturing the ophthalmic lens;

FIG. 2 schematically shows a top view of a raw lens blank provided in a step of the process in FIG. 1;

FIG. 3 schematically shows a top view of an ophthalmic lens obtained by implementing the process in FIG. 1;

FIG. 4 shows, again schematically, another step of the manufacturing process in FIG. 1, here the mounting and holding of the raw lens blank on/by a first holding device;

FIG. 5 shows, again schematically, another step of the manufacturing process in FIG. 1, here the machining, in a first machine tool, of an upper face of the lens blank to obtain a first optical area and thus form a semi-finished lens blank;

FIG. 6 shows, again schematically, another step of the manufacturing process in FIG. 1, here the machining, in the first machine tool, of a mechanical referencing element in the upper face of the semi-finished lens blank, so as to form a referenced semi-finished lens blank;

FIG. 7 shows, again schematically, another step of the manufacturing process in FIG. 1, here the machining, in a second machine tool, of a mechanical referencing element in the upper face of the semi-finished lens blank, so as to form a referenced semi-finished lens blank;

FIG. 8 shows, again schematically, another step of the manufacturing process in FIG. 1, here the mounting and holding of the referenced semi-finished lens blank on/by a second holding device;

FIGS. 9 to 11 illustrate top views of variant embodiments of the referenced semi-finished lens blank shown in FIGS. 6 to 8;

FIG. 12 is a front view of one variant of the second holding device shown in FIG. 8, in isolation; and FIGS. 13 to 16 each show the lens blank in FIGS. 2 and 3, as seen from in front and above, according to a plurality of variant embodiments of one chamfered zone that it comprises.

FIG. 1 illustrates various operating steps of a process for manufacturing by machining an ophthalmic lens, referenced LO in the block diagrams, from a raw lens blank.

The machining may here be turning and/or cutting and/or milling.

It is a question here of only certain steps of the manufacturing process because additional steps may be envisioned, for example steps of coating the lens blank with a film, or even storage steps (see below).

The raw lens blank 10 and the ophthalmic lens 1 will now be described with reference to FIGS. 2 and 3.

The ophthalmic lens is here formed from a raw lens blank 10, comprising a solid body generally molded from plastic.

This lens blank 10 is here in the raw state and has an upper face 12 having an upper surface 14, a lower face 13 opposite the upper face 12 and having a lower surface 15, and a peripheral outline called the peripheral edge face 17, which edge face joins the upper and lower faces 12, 13.

The upper and lower faces 12, 13 of the raw lens blank 10 are here substantially right and parallel to each other.

The upper face 12 of the raw lens blank 10 is provided to form the front face 2 of the lens 1 and the lower face 13 of the raw lens blank 10 is provided to form the back face 3.

Here, the ophthalmic lens 1 is configured to form a spectacle lens, which is intended to be fitted in a spectacle frame.

This ophthalmic lens has a first face, called the front face 2, which has a complex shape, here a substantially convex shape, and a second face, called the back face 3, which has a complex shape, here a substantially concave shape, and a peripheral edge face 7 that joins the front and back faces 2, 3.

The front face 2 has a first optical area called the front optical area 4 and the back face 3 has a second optical area called the back optical area 5.

The front and back optical areas 4 and 5 define a zone of the lens 1 called the optically useful zone 6, which has optical characteristics that are complex here. This optically useful zone 6 here has a diameter larger than or equal to about 40 mm.

This optically useful zone 6 is here centered on a prism reference point of the area, corresponding for example to the center of rotation of the lens 1 in the machining coordinate system of a machine tool.

This optically useful zone 6 is a zone of the lens 1 that is located in the spectacle frame once this lens 1 has been cut (milling) and trimmed (machining of the edge face) to the shape of this frame and mounted therein.

The front and back optical areas 4 and 5 here have complex surfaces ("free-form" or "digital" surfaces) that require difficult and particularly precise machining and more precisely surfacing, especially because of the large altitude variations, which may for example be combined with a torus and a progression, of these surfaces.

It is necessary to position correctly the ophthalmic lens 1, and more precisely its (as yet unmachined) back face 3 relative to its (already machined) front face 2 in order to produce the back face 3 of the ophthalmic lens 1 in accordance with the desired ophthalmic prescription.

As will be seen below, the ophthalmic lens 1 is not formed directly from the raw lens blank 10 but from the raw lens blank after it has undergone a number of modifications, first into a semi-finished lens blank and then into a referenced semi-finished lens blank, or first into a referenced lens blank and then into a referenced semi-finished lens blank, or directly into a referenced semi-finished lens blank; so as to form a plurality of intermediate products before the ophthalmic lens 1 is obtained.

It is these intermediate products, namely the referenced lens blank, or the semi-finished lens blank, or even the referenced semi-finished lens blank, that may undergo additional steps in the manufacturing process, such as for example a step of storage, or even of storage and transportation to another site, such as a production site or laboratory. For example, the referenced semi-finished lens blank is generally stored then sent to another site especially for the production of the back face 3 of the lens 1.

The process for manufacturing the ophthalmic lens 1 will now be described in greater detail with reference to FIG. 1 and also to FIGS. 4 to 8.

The process comprises the step 70 of providing a raw lens blank 10, corresponding to the raw lens blank such as described above.

The process comprises the step 71 of providing a first holding device, here formed by a vacuum clamp 30 (shown in FIG. 4) configured to be mounted in a first machine tool 20.

This vacuum clamp 30 comprises a generally circular base 31 that defines an internal space 32 forming a vacuum chamber, and a fluid transfer duct 33 allowing the vacuum chamber to be evacuated when the raw lens blank 10 is mounted on this vacuum clamp 30.

This vacuum clamp has a first machining frame of reference 18 (shown in FIG. 5) defined by three translational directions Tx, Ty and Tz corresponding to three axes of a basic orthonormal coordinate system and by three rotational directions Rx, Ry, Rz defined about said three translational directions, respectively, with two Tx, Ty of said three translational directions being located in one and the same first plane, referred to as the horizontal plane, and the other Tz of said three translational directions being located in a second plane, referred to as the vertical plane.

The process comprises the step 72 of mounting and holding the raw lens blank 10 on the vacuum clamp 30 (FIG. 4).

The raw lens blank 10 is mounted in a first position on the vacuum clamp 30 with its lower face 13 at least partially facing the base 31 and the internal space 32 of this vacuum clamp 30, in order to form therein the vacuum chamber.

A vacuum is then created in this vacuum chamber by virtue of the fluid transfer duct 33 in order to hold (or even block) in the first position the raw lens blank 10, via its lower face 13.

The manufacturing process then offers five possible choices for obtaining a referenced semi-finished lens blank, referenced SF-R in the block diagram.

One of the choices is representative of a single-step process whereas the other choices are representative of two-step processes for obtaining the referenced semi-finished lens blank SF-R.

As a first choice, the process comprises the step 74 of machining, in the first position of the raw lens blank 10 on the vacuum clamp 30 and in the first machining frame of reference 18, the upper face 12 of this raw lens blank 10 to obtain the front optical area 4 and thus form a semi-finished lens blank 8, referenced SF in the block diagram.

To do this, the vacuum clamp 30 is installed in the first machine tool 20 (FIG. 5) and the upper surface 12 of the raw lens blank 10 is machined, for example by turning, so as to obtain this front optical area 4.

The process then continues with the step 75 of machining, in a second machining frame of reference 19 defined in the same way as the first machining frame of reference 18, a mechanical referencing element here for example formed by a groove 40, in the upper face 12 of the semi-finished lens blank 8, outside of the optically useful zone 6 (which is known but only entirely visible on the finished lens 1), and more precisely in an optically unuseful zone 16.

This second machining frame of reference 19 is here coincident with the first machining frame of reference 18 because the vacuum clamp 30 is left in the same machine tool 20.

Steps 74 and 75 are here successive.

This second machining frame of reference 19 is therefore identically defined, by the same three translational directions Tx, Ty and Tz corresponding to the three axes of the basic orthonormal coordinate system and by the same three rotational directions Rx, Ry, Rz defined about said three translational directions, respectively, with two Tx, Ty of said three translational directions being located in the same first plane, and the other Tz of said three translational directions being located in the same second plane.

This step 75 allows a referenced semi-finished lens blank 9 to be obtained.

The groove 40 here forms a continuous and generally circular trench of closed outline that has a bottom 41 the depth of which varies along this groove 40. The depth of this groove 40 therefore varies.

This process makes it possible to know exactly the position of this groove 40 in the referenced semi-finished lens blank 9, and even relative to the front optical area 4.

As a second choice, the process first comprises the step 76 of machining, in the first machine tool 20, the groove 40 on the vacuum clamp 30 in order to obtain a referenced lens blank (not shown) then the step 77 of machining the upper surface 12 of the referenced lens blank in the same machine tool 20, in order to obtain the referenced semi-finished lens blank 9.

The first machining frame of reference 18 and the second machining frame of reference 19 are therefore also coincident.

The steps 76 and 77 are therefore carried out similarly to steps 75 and 76, the order of the steps being inverted.

As a third choice, the process comprises the step 73 of machining, in the first machine tool 20 and during the same machining operation, the upper face 12 and the groove 40 in order to obtain in a single step the referenced semi-finished lens blank 9.

Here, the steps of machining the upper face 12 and the groove 40 are merged and the first machining frame of reference and the second machining frame of reference are coincident.

To do this, the first machine tool 20 is configured to receive a machining file characteristic of the geometry of the referenced semi-finished lens blank (front optical area 4 produced in the optically useful zone 6 and mechanical referencing element produced in the optically unuseful zone 16), in contrast to the first and second choices described above, in which the first machine tool 20 is configured to receive a first machining file (based on a first reference) characteristic of the geometry of the semi-finished lens blank (front optical area 4 produced in the optically useful zone 6) and a second machining file (based on a second reference identical to the first) characteristic of the geometry of the referenced semi-finished lens blank (mechanical referencing element produced in the optically unuseful zone 16).

As a fourth choice, the process comprises the step 78 of machining, in the first position of the raw lens blank 10 on another first holding device here formed by a gripping clamp 130 and in the first machining frame of reference 18, the upper face 12 of the raw lens blank 10 in order to obtain the first optical area 4 and thus form a semi-finished lens blank 8, referenced SF in the block diagram (step identical to step 74 except that here it is a question of a gripping clamp 130 rather than a vacuum clamp 30).

This gripping clamp 130 comprises a generally circular base 134 and a clamping ring 135 that defines an internal space 136 (FIG. 7).

This gripping clamp 130 has a first machining frame of reference 18, similar to that of the vacuum clamp 30, which frame of reference 18 is defined by three translational directions Tx, Ty and Tz corresponding to three axes of a basic orthonormal coordinate system and by three rotational directions Rx, Ry, Rz defined about said three translational directions, respectively, with two Tx, Ty of said three translational directions being located in one and the same first plane, and the other Tz of said three translational directions being located in a second plane.

Beforehand, to hold the raw lens blank 10 in this gripping clamp 130, the raw lens blank 10 is at least partially mounted in the internal space 136, in a first position, with its lower face 13 at least partially facing the base 134.

The clamping ring 135 is then brought to bear against the raw lens blank 10 in order to clamp the latter via its peripheral edge face 17, in order to hold (or even block), in the first position, the raw lens blank 10 via its edge face.

For the machining step 78, the gripping clamp 130 is installed in the first machine tool 20 and the upper surface 12 of the raw lens blank 10 is machined, for example by turning, so as to obtain the first optical area 4, in order to form the semi-finished lens blank 8.

The process then continues with the step 79 of machining, in a second machining frame of reference 19 defined in the same way as the first machining frame of reference 18, a mechanical referencing element, formed for example by the groove 40, in the upper face 12 of the semi-finished lens blank 8, in the optically unuseful zone (FIG. 7).

To do this, the gripping clamp 130 is uninstalled from the first machine tool 20 and installed in a second machine tool 21, the semi-finished lens blank 8 remaining in the same position on the gripping clamp 130 (a system makes it possible to keep the lens blank clamped during the change of machine).

In this case, the first machining frame of reference 18 and the second machining frame of reference 19 are separate, and the second machining frame of reference 19 has a known offset relative to the first machining frame of reference 18.

This second machining frame of reference 19 (shown in FIG. 7) is preset and similarly defined, with a known offset, by three translational directions Tx', Ty' and Tz' corresponding to the three axes of a basic orthonormal coordinate system and by three rotational directions defined about three translational directions, respectively, with two Tx', Ty' of the three translational directions being located in one and the same first plane, referred to as the horizontal plane, and the other Tz' of the three translational directions being located in a second plane, referred to as the vertical plane.

The first machine tool 20 is configured to receive a first machining file (based on a first reference) characteristic of the geometry of the semi-finished lens blank (front optical area 4 produced in the optically useful zone) and the second machine tool 21 is configured to receive a second machining file (based on a second preset reference and the offset of which is known relative to the first) characteristic of the geometry of the referenced semi-finished lens blank (mechanical referencing element produced in the optically unuseful zone).

As a fifth choice, the process first comprises the step 80 of machining, in the first machine tool 20, the groove 40 on the gripping clamp 130 in order to obtain a referenced lens blank (not shown) then the step 81 of machining the upper surface 12 of the referenced lens blank in the second machine tool 21, in order to obtain the referenced semi-finished lens blank 9.

The first machining frame of reference 18 and the second machining frame of reference 19 are therefore also separate.

The steps 80 and 81 are therefore carried out similarly to steps 78 and 79, the order of the steps being inverted.

The first position in which the raw lens blank 10 is mounted and held on the vacuum clamp 30 or on the gripping clamp 130 (step 72) is a position in which it is possible to machine (steps 73, 74, 77, 78, 81) the upper face 12 of the raw lens blank 10 and to machine (steps 73, 75, 76, 79, 80) the groove 40 in order to form the referenced semi-finished lens blank SF-R. In other words, the first position is any position, insofar as it is it neither set nor preset, in which the aforementioned machining steps are possible.

The process comprises the step 82 of polishing the referenced semi-finished lens blank 9. This step may be carried out in a specific machine (not shown) or in the first or second machine tool 20, 21.

The process comprises the step 83 of demounting the referenced semi-finished lens blank from the first holding device, namely the vacuum clamp 30 or the gripping clamp 130.

To do this, it is enough to vent the vacuum chamber of the vacuum clamp 30 to atmosphere by virtue of the fluid transfer duct 33 or to declamp the clamping ring 135 of the gripping clamp 130.

The process comprises the step 84 of providing a second holding device 50, here formed by a machining clamp 50 provided with an additional mechanical referencing element configured to interact with the mechanical referencing element of the referenced semi-finished lens blank 9.

This machining clamp 50 comprises a generally circular base 51 and a cylindrical side wall 52 that define an internal space 55 forming a vacuum chamber, and a fluid transfer duct 54 allowing the vacuum chamber to be evacuated when the referenced semi-finished lens blank 9 is mounted on this machining clamp 50.

This machining clamp 50 furthermore comprises, at a free end of the cylindrical side wall 52, opposite the base 51, a protuberance 53, also referred to as a finger, forming the complementary mechanical referencing element.

This protuberance 53 is configured to interact and more precisely to abut against the bottom 41 of the groove 40, so that the referenced semi-finished lens blank 9 is positioned and held on the machining clamp 50 in a second position that is preset, here in three translational directions Tx, Ty and Tz and in three rotational directions Rx, Ry and Rz defined about these translational directions, respectively (see below).

The process comprises the step 85 of mounting and holding the referenced semi-finished lens blank 9 on the machining clamp 50 (FIG. 9).

The semi-finished lens blank 9 is mounted in a second preset position on the machining clamp 50 with the bottom 41 of the groove 40 in abutment against the protuberance 52 of this machining clamp 50.

Thus arranged, the referenced semi-finished lens blank 9 has its upper face 12 at least partially facing the base 51 and the internal space 55 of this machining clamp 50, in order to allow the lower face 13 to then be machined.

The semi-finished lens blank 9 is therefore mounted on the machining clamp 50 in such a way that it is positioned and held, via its modified upper face 12 (i.e. its front face 2), in the second position, which is preset in the three translational directions Tx, Ty and Tz and in the three rotational directions Rx, Ry and Rz defined about these translational directions, respectively, by virtue of the groove 40 and the protuberance 53.

In this second preset position, the position of the lower face 13 relative to the front optical area 4 is set in the three translational directions Tx, Ty and Tz and in the three rotational directions Rx, Ry and Rz.

The process comprises the step 86 of machining, on the machining clamp 50, the lower face 13 of the referenced semi-finished lens blank 9 in order to obtain the back optical area 5 and thus form the ophthalmic lens 1, referenced LO in the block diagram.

To do this, the gripping clamp 50 is installed in a third machine tool 22 (FIG. 8) and the lower surface 15 of the referenced semi-finished lens blank 9 is machined, for example by turning, so as to obtain the back optical area 5.

The process comprises the step 87 of trimming (and cutting) the ophthalmic lens 1 by machining (and milling) the peripheral edge face 17 in order to form thus the edge face 7 of the lens 1, then of polishing the back optical area 5 and lastly engraving the back face 3 of the lens.

These engravings may for example be marks allowing the lens to be identified, or other commercial marks.

These marks are generally produced by micro-engraving or are printed marks, called temporary marks.

The process comprises the step 88 of demounting the ophthalmic lens 1 from the second holding device, namely the machining clamp 50, and to do this all that is required is to vent the vacuum chamber of the machining clamp 50 to atmosphere by virtue of the fluid transfer duct 54.

FIG. 9 illustrates one variant embodiment of a mechanical referencing element of the referenced semi-finished lens blank.

The referenced semi-finished lens blank 9 in FIG. 9 has a mechanical referencing element here formed by machining, outside of the optically useful zone 6, a chamfered zone 42 produced partially in the peripheral edge face 17 and in the upper face 12, part of which has been modified to form the front face 2 and front optical area 4.

The chamfered zone 42 is continuous and of variable size widthwise. Here, the chamfered zone 42 contains two narrow portions 43 that are opposite and two wide portions 44 that are opposite, the distribution of the portions 43 and 44 on the outline of the semi-finished lens blank 9 being alternate.

This variable chamfered zone 42 and the peripheral edge face 17 together form mechanical referencing elements configured to position the referenced semi-finished lens blank 9 in the second position, which position is preset in the three translational directions Tx, Ty and Tz and in the three rotational directions Rx, Ry and Rz defined about these translational directions, respectively.

FIG. 10 illustrates another variant embodiment of a mechanical referencing element of the referenced semi-finished lens blank.

The referenced semi-finished lens blank 9 in FIG. 10 has a mechanical referencing element here formed by machining, outside of the optically useful zone 6, a chamfered zone 45 produced partially in the peripheral edge face 17 and in the upper face 12, part of which has been modified to form the front face 2 and front optical area 4.

Here, the chamfered zone 45 is continuous (but without a closed outline) and of constant width.

The referenced semi-finished lens blank 9 in FIG. 10 furthermore has a blocking zone formed by machining a flat 46 in the peripheral edge face 17.

This constant chamfered zone 45, the flat 46 and the peripheral edge face 17 together form mechanical referencing elements configured to position the referenced semi-finished lens blank 9 in the second position, which position is preset in the three translational directions Tx, Ty and Tz and in the three rotational directions Rx, Ry and Rz defined about these translational directions, respectively.

The chamfered zones illustrated in FIGS. 4 and 5 each have a slope, or angle of inclination, relative to the edge face 17 of the referenced semi-finished lens blank 9, comprised between about 20° and about 45°.

This angle of inclination is set so as to increase contact between the lens blank 9 and the second holding device 50 depending on at least one preset constraint (see below with reference to FIGS. 13 to 16).

FIG. 11 illustrates yet another variant embodiment of a mechanical referencing element of the referenced semi-finished lens blank.

The referenced semi-finished lens blank 9 in FIG. 11 has a plurality of mechanical referencing elements here formed by machining, outside of the optically useful zone 6, three individual indents 47, which here are crescent shaped, produced, with a regular distribution, in the peripheral edge face 17 and in the upper face 12, part of which has been modified to form the front face 2 and front optical area 4.

These three indents form mechanical referencing elements configured to position the referenced semi-finished lens blank 9 in the second position, which position is preset in the three translational directions Tx, Ty and Tz and in the three rotational directions Rx, Ry and Rz defined about these translational directions, respectively.

As a variant, illustrated in FIG. 12, the machining clamp 50 in FIG. 8 is replaced by a blocking ring 150.

This blocking ring 150 comprises a generally circular base 156 and a cylindrical side wall 157 that defines an internal space.

The blocking ring 150 also comprises a generally circular shoulder 160 produced in the cylindrical side wall 157 and defining a sharp ridge 161, itself generally circular.

The shoulder 160 thus defines a first internal lateral portion 158 between the shoulder 160 and the base 156 and a second internal lateral portion 159 between the shoulder 160 and a free end of the blocking ring 150.

The shoulder 160, and more precisely the sharp ridge 161, and the second internal lateral portion 159 together form complementary mechanical referencing elements configured to position the referenced semi-finished lens blank 9 in the second position, which position is preset in the three translational directions Tx, Ty and Tz and in the three rotational directions Rx, Ry and Rz defined about these translational directions, respectively.

The blocking ring 150 may be used in combination with the referenced semi-finished lens blanks 9 in FIGS. 9 and 10, the respective chamfered zone 42 and 45 being configured to abut against the sharp ridge 161, and the respective peripheral edge face 17 to fit into the blocking ring 150 tight against the second internal lateral portion 159.

Another complementary mechanical referencing element (not shown) may be produced in the blocking ring 150 in order to receive the flat 46 of the referenced semi-finished lens blank 9 in FIG. 10.

FIGS. 13 to 16 illustrate the lens blank 1 with various variant embodiments of the chamfered zone illustrated in FIG. 10. Reference will be made below to chamfers rather than chamfered zones.

In FIGS. 13 and 14, the lens blank 9 has a front face, here a progressive face, and the chamfer 45 that it comprises has an angle of inclination $\alpha_1$ of about 45° and an angle of inclination $\alpha_2$ of about 20°, relative to the edge face 17 of the lens blank 9.

These distinct angles of inclination $\alpha_1$ and $\alpha_2$ of the chamfer 45 are determined so as to increase contact between the lens blank 9 and the second holding device depending on at least one preset constraint.

FIGS. 13 and 14 illustrate perimeters of contact 70 between the lens blank 9 and the second holding device.

These perimeters of contact 70 are of distinct lengths along the chamfer 45; and are representative of the lengths of angular sectors, denoted $\theta_1$ and $\theta_2$, passing through the optical center or prism reference point or even the geometric center P of the lens, from which sectors the length of the flat 46 of the lens blank 9 must be subtracted.

The perimeter of contact 70 between the shoulder of a given second holding device and the chamfer 45 of angle of inclination $\alpha_1$ is representative of the smaller angular sector $\theta_1$, which is smaller than the angular sector $\theta_2$ that represents the perimeter of contact 70 between the shoulder of this given second holding device and the chamfer 45 of angle of inclination $\alpha_2$.

In other words, the percentage of contact between the lens blank illustrated in FIG. 13 and the given second holding device is less than the percentage of contact between the lens blank illustrated in FIG. 14 and this given second holding device.

Therefore, the lens blank illustrated in FIG. 14 will be more stable in the given second holding device than the lens blank illustrated in FIG. 13 for the same second holding device.

In FIGS. 15 and 16, the lens blank 9 has a front face, here a regressive face, and the chamfer 45 that it comprises has an angle of inclination $\alpha_1$ of about 45° and an angle of inclination $\alpha_3$ of about 30°, respectively, relative to the edge face 17 of the lens blank 9.

These distinct angles of inclination $\alpha_1$ and $\alpha_3$ of the chamfer 45 are themselves set so as to increase contact between the lens blank 9 and the second holding device depending on at least one preset constraint.

FIGS. 15 and 16 also illustrate perimeters of contact 70 between the lens blank 9 and the second holding device, these perimeters 70 here having one and the same length substantially equal to the length of the chamfer 45.

FIGS. 15 and 16 furthermore illustrate radii Rv representative of the radius of an optically useful zone desired for the ophthalmic lens and radii $Rr_1$ and $Rr_2$ representative of the minimum radius of an optically useful zone obtained on the lens blank 9 with the chamfer 45 produced in the latter, these radii passing through the optical center or the prism reference point or even the geometric center P of the lens.

This optically useful zone must not contain the chamfer 45.

The radius $Rr_1$ obtained with a chamfer 45 of angle of inclination $\alpha_1$ is smaller than the radius $Rr_2$ obtained with a chamfer 45 of angle of inclination $\alpha_3$.

In other words, the diameter of the ophthalmic lens obtainable with a chamfer 45 of angle of inclination $\alpha_3$ is larger than the diameter of the ophthalmic lens obtainable with a chamfer 45 of angle of inclination $\alpha_1$.

Therefore, the lens that can be obtained from the lens blank illustrated in FIG. 16 has a larger aperture than the lens obtainable with the lens blank illustrated in FIG. 15.

The aperture of the ophthalmic lens is representative of the size of the optically useful zone.

The two constraints given above, namely the stability of the lens blank in a given second holding device and the aperture of the lens, may be used individually or in combination to determine the angle of inclination of the chamfer produced in the lens blank.

It will be noted that in the examples given above the lens blanks had progressive and regressive surfaces, but lens blanks with toroidal surfaces could also be used.

More generally, the angle of inclination of the chamfer produced in the lens blank is advantageously determined once the lens blank has a surface that is not axisymmetric.

The angle of inclination is determined before steps 73 to 81 of machining the upper face and the mechanical referencing elements in the lens blank.

The angle of inclination is for example set when the geometry of the lens and the geometry of the mechanical referencing elements in the lens blank are defined, depending on the geometry of a given second holding device.

The angle of inclination is for example determined by iterative calculation, by calculating the perimeter of contact between the chamfer and the shoulder of a given second holding device until an angle of inclination is obtained that allows a given percentage of contact, for example higher than about 55% of the perimeter of contact between the chamfer and the shoulder, to be achieved; with the aim of meeting the stability constraint.

As a variant or additionally, the angle of inclination is for example determined by iterative calculation, by calculating the resultant radius of the chamfered lens blank until an angle of inclination that allows a resultant radius that is at least equal to or even larger by 1 mm than a given lens radius to be achieved, for example higher than about 55% of the perimeter of contact between the chamfer and shoulder; with the aim of meeting the aperture constraint.

As a variant (not illustrated) the machining clamp in FIG. 8 is not provided with a cylindrical protuberance produced in a cylindrical side wall, but with three protuberances each protruding from this cylindrical side wall, which protuberances are configured to lodge in the three individual indents of the referenced semi-finished lens blank 9 in FIG. 11.

As variants (not illustrated):

the lens blank is provided with a plurality of mechanical referencing elements, including at least one chamfered zone and/or at least one grooved zone and/or a plurality of individual indents;

the first face of the lens blank to be machined is not the front face but rather the back face, the front face therefore being machined next; more generally, the expressions "first face" and "second face" may refer to either face, independently of its position (front or back) and independently of whether said face has a complex, simple, concave or convex shape;

the upper and lower faces of the raw lens blank are not substantially right and parallel to each other, but instead are right but not parallel, or one is concave and the other convex, or both are concave or both are convex, or these faces and the edge face are even substantially flat and potato-shaped;

the process may comprise a step of coating the lower face of the raw lens blank with a film between steps 70 and 71; is a question of applying to this lower face a plastic film that protects the latter;

the first holding device is not formed by a vacuum clamp nor by a gripping clamp but rather by a traditional machine-tool clamp in which a block, generally provided with a pre-block, is clamped;

the second holding device is not formed by a machining clamp or by a blocking ring but rather by a machining shaft or a robot;

the first and/or second holding device contains a cavity that contains openings on both sides of its base, into which cavity a binder, for example a fusible metal or a wax is made to flow;

the chamfered or grooved zone is not continuous but only produced in one portion of the outline, even in a plurality of portions of the outline;

the three individual indents of the referenced semi-finished lens blank in FIG. 11 are replaced by tapped holes opening onto the upper and lower faces of the lens blank, outside of the optically useful zone;

the flat of the referenced semi-finished lens blank in FIG. 10 is simply replaced by a notch or a mark made by engraving;

the mechanical referencing element is a grove or a protuberance produced in/on the peripheral edge face of the lens blank and the referenced lens blank is demounted from the first holding device before the upper face is machined to obtain the first optical area;

the chamfered or grooved zone is of variable size, thereby furthermore allowing a base down prism to be taken into account before the machining and for the machining of the lower face, which base down prism does not therefore need to be taken into account in a blocker or machine tool;

the mechanical referencing elements and complementary mechanical referencing elements are specifically dimensioned depending on the lens, or depending on the type of lens, or in contrast their dimensions are set independently of the lens;

the second holding device is provided with two separate systems, namely a first system for positioning and holding the referenced semi-finished lens blank and a second system for blocking this lens blank; and/or the permanent or temporary marks, for example produced by engraving, are produced on the front face of the lens rather than on its back face.

It is recalled more generally that the invention is not limited to the examples described and shown.

The invention claimed is:

1. A process for manufacturing by machining an ophthalmic lens (1) having a first face (2) and a second face (3) opposite said first face (2), said first face (2) being provided with a first optical area (4) and said second face (3) being provided with a second optical area (5), said first and second optical areas (4, 5) defining an optically useful zone (6) of said ophthalmic lens (1), said process comprising steps of:

providing (70) a lens blank (10) having an upper face (12), and a lower face (13) opposite said upper face (12) and a peripheral edge face (17) joining said upper and lower faces (12, 13);

providing (71) a first holding device (30; 130) having a first machining frame of reference (18) defined by three translational directions corresponding to three axes of a basic orthonormal coordinate system and by three rotational directions defined about said three translational directions, respectively, with two of said three translational directions being located in one and the same first plane and the other of said three translational directions being located in a second plane;

said process being characterized in that it comprises steps of:

mounting (72) said lens blank (10) on said first holding device (30; 130) in a first position in which said lower face (13) of said lens blank (10) is facing said first holding device (30; 130), which is configured to hold said lens blank (10) via its lower face (3) or via its peripheral edge face (17);

machining (73; 74; 77; 78; 81), in said first position in said first machining frame of reference (18), said upper face (12) to obtain said first optical area (4) and thus form a semi-finished lens blank (8);

machining (73; 75; 76; 79; 80), in a second machining frame of reference (19) defined in the same way as said first machining frame of reference (18), at least one mechanical referencing element (42; 45; 47) in at least any one of said upper and lower faces (12, 13) and said peripheral edge face (17), said second machining frame of reference (19) being preset and known relative to said first machining frame of reference (18), and said machining step (73; 75; 76; 79; 80) being configured so that said at least one mechanical referencing element (42; 45) is located outside of said optically useful zone (6), so as thus to form a referenced semi-finished lens blank (9); and providing (84) a second holding device (150) comprising at least one complementary mechanical referencing element (159, 161), which is configured to interact with said at least one mechanical referencing element (42; 45) of said referenced semi-finished lens blank (9) so that the latter is positioned and held on said second holding device (150) in a second position that is preset at least in said three translational directions and in said two rotational directions defined about said two translational directions that are located in said first plane, respectively, said at least one mechanical referencing element being formed by machining at least one chamfered zone (42; 45) produced at least in said peripheral edge face (17) and in either one of said upper and lower faces (12, 13), outside of said optically useful zone (6), and said at least one complementary mechanical referencing element being formed by at least one shoulder (160, 161) produced in said second holding device (150) and configured to receive in abutment said at least one chamfered zone.

2. The process as claimed in claim 1, wherein said first machining frame of reference (18) and said second machining frame of reference (19) are coincident.

3. The process as claimed in claim 1, wherein said steps (73; 74; 77) of machining said upper face (12) and said at least one mechanical referencing element (42; 45) are successive or merged.

4. The process as claimed in claim 1, wherein said first machining frame of reference (18) and said second machining frame of reference (19) are separate, said second machining frame of reference having a known offset relative to said first machining frame of reference.

5. The process as claimed in claim 1, wherein at least one other of said mechanical referencing elements is formed by machining at least one grooved zone (40) produced in said peripheral edge face (17) or in either one of said upper and lower faces (12, 13), outside of said optically useful zone (6); and at least one other of said complementary mechanical referencing elements is formed by at least one protuberance (53) produced in said second holding device (50) and configured to be received in abutment in said at least one grooved zone (40).

6. The process as claimed in claim 1, wherein said at least one chamfered zone (45) is at least partially continuous and of constant size, of constant width or depth, respectively, and said at least one mechanical referencing element is furthermore formed by machining a blocking zone (46) on said peripheral edge face (17), which blocking zone (46) is configured to position said referenced semi-finished lens blank (9) in said rotational direction defined about said translational direction that is located in said second plane.

7. The process as claimed in claim 1, wherein said at least one chamfered zone (42) is at least partially continuous and of variable size, of variable width or depth, respectively.

8. The process as claimed in claim 1, wherein at least one other of said mechanical referencing elements is formed by machining a plurality of individual indents (47) produced in said peripheral edge face (17) and/or in either one of said upper and lower faces (12, 13), outside of said optically useful zone (6); and at least one other of said complementary mechanical referencing elements is formed by a plurality of protuberances produced in said second holding device and configured to receive in abutment said plurality of individual indents.

9. The process as claimed in claim 1, further comprising steps of:
mounting (85) said referenced semi-finished lens blank (9) on said second holding device (150) in said second preset position, said device (50; 150) being configured to hold said referenced semi-finished lens blank (9) via its upper face (12) or via its peripheral edge face (17); and
machining (86) said lower face (13) of said referenced semi-finished lens blank (9) to obtain said second optical area (5) and thus form said ophthalmic lens (1).

10. The process as claimed in claim 1, wherein said at least one chamfered zone (42, 45) of said lens blank (9) has an angle of inclination ($\alpha_1$, $\alpha_2$, $\alpha_3$) relative to said edge face (7) of said lens blank (9), which angle of inclination is set so as to increase contact between said lens blank (9) and said second holding device (150) depending on at least one preset constraint.

11. The process as claimed in claim 10, wherein said angle of inclination ($\alpha_1$, $\alpha_2$, $\alpha_3$) of said at least one chamfered zone (42, 45) is set depending on a characteristic representative of a perimeter of contact between said at least one chamfered zone (42, 45) of said lens blank (9) and said complementary mechanical referencing element (159, 161) of said second holding device (50; 150) in order to ensure the stability of said lens blank (9) in said second holding device (150).

12. The process as claimed in claim 10, wherein said angle of inclination ($\alpha_1$, $\alpha_2$, $\alpha_3$) of said at least one chamfered zone (42, 45) is set depending on a characteristic representative of an optically useful zone (6) of said ophthalmic lens in order to ensure a preset aperture for said ophthalmic lens.

13. The process as claimed in claim 2, wherein said steps (73; 74; 77) of machining said upper face (12) and said at least one mechanical referencing element (42; 45) are successive or merged.

14. The process as claimed in claim 11, wherein said angle of inclination ($\alpha_1$, $\alpha_2$, $\alpha_3$) of said at least one chamfered zone (42, 45) is set depending on a characteristic representative of an optically useful zone (6) of said ophthalmic lens in order to ensure a preset aperture for said ophthalmic lens.

\* \* \* \* \*